United States Patent Office 3,580,759
Patented May 25, 1971

3,580,759
HEAT TRANSFER ADDITIVES FOR ABSORBENT SOLUTIONS
Clarence E. Albertson, Villa Park, and Robert H. Krueger, Palatine, Ill., assignors to Borg-Warner Corporation, Chicago, Ill.
No Drawing. Filed June 25, 1968, Ser. No. 739,629
Int. Cl. C09k 3/02
U.S. Cl. 252—71                         8 Claims

ABSTRACT OF THE DISCLOSURE

Improved heat transfer additives for lithium bromide absorbent solutions are selected from a class of tertiary alcohols. The tertiary alcohols have greater oxidative stability and, therefore, do not react as rapidly with the chromate corrosion inhibitors which are commonly used in the absorbent solutions. In all cases, the heat transfer improvement is at least as good as known, less stable, primary (and secondary) alcohols.

BACKGROUND AND SUMMARY OF THE INVENTION

In the type of absorption refrigeration system to which the present invention pertains, the absorbent solution is conventionally a hydroscopic saline solution which is capable of absorbing water vapor released in the evaporator. For purposes of this disclosure, reference will be made to a lithium bromide brine as the absorbent, although other salts have been used successfully. Depending on the capacity at which the system is operating, the concentration of LiBr in the solution is from 58% to 65% by weight.

It is also conventional to use a corrosion inhibitor which is compatible with the salt; and in the case of a lithium bromide system, such corrosion inhibitor may be lithium chromate, lithium molybdate, lithium nitrate and related salts. More recently, it has been found that certain alcohols improve the heat transfer between the absorbent solution and a coolant, e.g. water, employed to remove the heat of the solution released when the water vapor is absorbed. These additives, prior to the present invention, have been primary alcohols, for example, N-octyl alcohol or 2-ethylhexanol, the latter being almost universally used in commercial absorption systems.

While the mechanism whereby the heat transfer is improved is not completely understood, it is believed that the alcohols cause dropwise condensation in the condenser and alter the surface tension of the solution at the absorber tube interface. In any event, the heat transfer improvement, and the corresponding increase in efficiency, in such systems has been well established; and there is no question that the use of such additives is advantageous and worth the additional expense.

One of the problems which has been encountered is that the alcohols are unstable in that they enter into a reaction with the corrosion inhibitor. For example, in a solution containing lithium chromate the Cr is reduced from valence +6 to valence +3, while the alcohol is oxidized. The present invention proposes to use a more stable heat transfer additive comprising tertiary alcohols containing 6–12 carbon atoms. The performance of these tertiary alcohols, with respect to improved heat transfer, is at least as good as the 2-ethylhexanol now used, and is significantly more stable in a system using a chromate inhibitor.

Greater oxidative stability is extremely important in the operation of absorption refrigeration systems because it means that the system can operate at maximum efficiency for longer period of time, thereby reducing maintenance and soultion replacement costs, and the corrosion inhibitor is not depleted as rapidly, thereby giving longer lasting equipment.

Another important consideration in the selection of heat transfer additives is the solubility of the additive in the brine solution. For monofunctional alkyl alcohols of the same molecular weight, the solubility increases in the order of primary alcohols, secondary alcohols, and tertiary alcohols.

Difficulties have been experienced with the use of primary alcohols such as 2-ethylhexanol, whereby the additive separates from the solution and collects at certain locations in the system. An additive which is more soluble in the saline solution is carried through the system more easily and, therefore, the heat transfer promotion effect is more improved.

While the description which follows deals primarily with the heat transfer effect in the absorber, some mention should be made of heat transfer improvements in the condenser. Some of the tertiary alcohols described herein have shown significant heat transfer improvement in the condenser. Although the most critical heat transfer conditions exist in the absorber, the overall efficiency is increased by smaller improvements in the condenser section.

It is therefore a principal object of this invention to provide effective heat transfer additives for saline absorbent solutions which have greater oxidative stability.

Another object of this invention is to provide an improved method for increasing the heat transfer in the condenser and absorber of an absorption refrigeration system, whereby the system can operate at maximum efficiency for longer periods of time.

Still another object of the invention is to provide a heat transfer additive which is less reactive with the oxidizing corrosion inhibitors normally used in absorbent solutions, or other oxidants present in the system, such as air.

Additional objectives and advantages will be apparent from reading the following detailed description.

DETAILED DESCRIPTION OF THE INVENTION

As discussed above, the invention relates specifically to a certain class of tertiary, monohydric alkyl alcohols which have been found to be effective in promoting the heat transfer, particularly in the condenser and absorber, and which have an oxidative stability and have improved solubility in the saline solution. The class of alcohols may be further characterized by their having 6 to 12 carbon atoms (i.e. molecular weight from about 102 to about 186). The following structural formula represents all the tertiary alkyl alcohols falling within this definition.

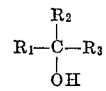

Where $R_1$, $R_2$ and $R_3$ are alkyl radicals, which may be the same or different, and the total number of carbon atoms in $R_1$, $R_2$ and $R_3$ is in the range of 5 to 11.

To further illustrate the heat transfer promotion of these additives a test absorber was constructed such that the heat input from a unit simulating the concentrating effect of the generator was measured and compared to the heat absorbed by a circulating stream of coolant (water) passing through the absorber heat exchanger tube bundle. The relatively concentrated solution was distributed uniformly over the tube bundle in such a way that a comparative external heat transfer value could be established for testing different additives.

The following table compares various tertiary alcohols with 2-ethylhexanol. The value of $H_o$ in each example is the heat transfer at the exterior surface of the tubes in the test absorber described above.

TABLE I

| Test No. | Additive | Percent | $H_o$ Before additive | $H_o$ After additive | Increase | Percent increase |
|---|---|---|---|---|---|---|
| 1 | 2-ethyl-1-hexanol | 0.10 | 280 | 378 | 98 | 35.0 |
| 2 | 5-methyl-5-undecanol | 0.05 | 342 | 338 | −4 | −1.2 |
|   |   | 0.10 |   | 345 | 3 | .9 |
|   |   | 0.20 |   | 342 | 0 | 0.0 |
| 3 | 2-methyl-2-nonanol | 0.05 | 331 | 421 | 90 | 27.2 |
|   |   | 0.10 |   | 448 | 117 | 35.4 |
|   |   | 0.20 |   | 514 | 183 | 55.3 |
|   |   | 0.25 |   | 584 | 253 | 76.4 |
|   |   | 0.30 |   | 584 | 253 | 76.4 |
| 2 | 2-methyl-2-octanol | 0.05 | 372 | 532 | 160 | 43.0 |
|   |   | 0.10 |   | 520 | 148 | 39.8 |
|   |   | 0.15 |   | 529 | 157 | 42.2 |
| 5 | 3,6-dimethyl-3-octanol | 0.05 | 334 | 540 | 206 | 61.8 |
|   |   | 0.10 |   | 538 | 204 | 61.2 |
| 6 | 4-methyl-4-decanol | 0.05 | 346 | 641 | 296 | 85.6 |
|   |   | 0.10 |   | 658 | 312 | 90.2 |
| 7 | 2-methyl-2-heptanol | 0.05 | 332 | 506 | 174 | 52.4 |
|   |   | 0.10 |   | 526 | 194 | 58.4 |
|   |   | 0.15 |   | 538 | 206 | 61.1 |
|   |   | 0.20 |   | 532 | 200 | 60.3 |
| 8 | 3-methyl-3-nonanol | 0.05 | 353 | 509 | 156 | 44.2 |
|   |   | 0.10 |   | 570 | 217 | 61.5 |
|   |   | 0.15 |   | 589 | 236 | 66.9 |
|   |   | 0.20 |   | 637 | 284 | 80.5 |
|   |   | 0.25 |   | 683 | 330 | 93.5 |

From Table I, it can be seen that the heat transfer effect of the tertiary alcohols is at least as good as the 2-ethylhexanol which is used commercially in absorption refrigeration systems. The following table will illustrate the reactivity with lithium chromate which is conventional corrosion inhibitor for LiBr solutions.

TABLE II

[Reduction of $Li_2CrO_4$ by alcohols]

| Alcohol | Type | Percent $Li_2CrO_4$ after refluxing at 320° F. in 63 percent LiBr | | | |
|---|---|---|---|---|---|
|   |   | 4 hrs. | 1 wk. | 4 wks. | 8 wks. |
| 2-ethyl-1-hexanol | Primary | .24 | .05 |   |   |
| 3,6-dimethyl-3-octanol | Tertiary | .30 | .24 | .13 | .11 |
| 2-methyl-2-nonanol | do | .28 | .27 | .24 | .15 |
| 3-methyl-3-nonanol | do | .30 | .24 | .05 | .01 |
| 2-methyl-2-decanol | do | .30 | .29 | .12 | .02 |
| Do | do | .30 | .27 | .15 | .11 |
| 4-methyl-4-heptanol | do | .25 | .17 | .11 | .01 |
| 4-methyl-4-nonanol | do | .25 | .17 | .01 |   |
| 2-heptanol | Secondary | .29 | .06 | <.01 |   |
| 2-octanol | do | .30 | .13 | <.01 |   |
| 5-ethyl-2-heptanol | do | .30 | .15 | <.01 |   |
| 2-methyl-3-hexanol | do | .30 | .29 | .28 |   |
| 5-methyl-3-heptanol | do | .29 | .07 | <.01 |   |
| 3-ethyl-3-heptanol | do | .29 | .12 | <.01 |   |
| 2-methyl-2-heptanol [1] | Tertiary | .30 | .17 | .11 |   |
| 3-methyl-3-pentanol [1] | do | .30 | .27 | .26 |   |
| 2-methyl-2-hexanol | do | .30 | .29 | .27 |   |
| 2-methyl-2-heptanol | do | .30 | .24 | .22 |   |
| 3-ethyl-3-pentanol | do | .30 | .29 | .27 |   |
| 4-methyl-4-octanol | do | .30 | .16 | .12 |   |

[1] The boiling point (255° F.) of these alcohols is much lower than the boiling point of the solution (320° F.). Therefore, their high stability may be because the alcohol stays primarily in the condenser and does not contact the solution.

While reference has been made herein to the use of lithium chromate as a corrosion inhibitor, it should be pointed out that other compatible inorganic and organic inhibitors may also be used. The oxidative stability of the tertiary alcohols will be greater than primary alcohols regardless of the inhibitor. Other inhibitors which may be used in a lithium bromide solution are: lithium hydroxide; lithium molybdate; lithium nitrate; lithium phosphate; lithium silicate; lithium borate; lithium perchlorate; lithium tungstate; lithium vanadate; lithium arsenite; lithium thiocyanate; lithium silicofluoride; lithium antimonate; urea; diphenylguanidine; and mercaptobenzothiazole.

While this invention has been described in connection with certain specific embodiments thereof, it is to be understood that this is by way of illustration and not by way of limitation; and the scope of the appended claims should be construed as broadly as the prior art will permit.

What is claimed is:

1. An absorbent fluid for use in an absorption refrigeration system consisting essentially of 55–65% lithium bromide, from .05 to 2% of a reducible corrosion inhibitor, from 0.01% to 1% of a monohydric tertiary alkyl alcohol having 6 to 12 carbon atoms, and the balance water.

2. An absorbent solution as defined in claim 1, wherein said monohydric tertiary alkyl alcohol is 5-methyl-5-undecanol.

3. An absorbent solution as defined in claim 1, wherein said monohydric tertiary alkyl alcohol is 2-methyl-2-nonanol.

4. An absorbent solution as defined in claim 1, wherein said monohydric tertiary alkyl alcohol is 2-methyl-2-octanol.

5. An absorbent solution as defined in claim 1, wherein said monohydric tertiary alkyl alcohol is 2-methyl-2-heptanol.

6. An absorbent solution as defined in claim 1, wherein said monohydric tertiary alkyl alcohol is 3-methyl-3-nonanol.

7. An absorbent solution as defined in claim 1, wherein said monohydric tertiary alkyl alcohol is 3,6-dimethyl-3-octanol.

8. An absorbent solution as defined in claim 1, wherein said monohydric tertiary alkyl alcohol is 4-methyl-4-decanol.

No references cited.

JOHN D. WELSH, Primary Examiner

U.S. Cl. X.R.

252—68, 73; 62—114